United States Patent
Forgang et al.

(10) Patent No.: US 8,301,384 B2
(45) Date of Patent: *Oct. 30, 2012

(54) WELLBORE LOGGING PERFORMANCE VERIFICATION METHOD AND APPARATUS

(75) Inventors: Stanislav Wilhelm Forgang, Houston, TX (US); Randy Gold, Houston, TX (US); Zhiyong Jiang, Pearland, TX (US); Carlos A. Yanzig, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 62 days.

This patent is subject to a terminal disclaimer.

(21) Appl. No.: 12/850,978

(22) Filed: Aug. 5, 2010

(65) Prior Publication Data

US 2011/0035153 A1 Feb. 10, 2011

Related U.S. Application Data

(63) Continuation-in-part of application No. 11/947,250, filed on Nov. 29, 2007, now Pat. No. 7,797,111.

(51) Int. Cl.
*G01V 1/40* (2006.01)
*G01V 3/00* (2006.01)
(52) U.S. Cl. .......................... 702/11; 324/347
(58) Field of Classification Search .............. 702/11, 702/1–2, 6–7, 14, 16, 57, 64–67, 70–73, 702/75–76, 81, 84–85, 93, 104, 106–109, 702/116–117, 124, 127, 182–183, 188–189; 324/345–348, 351–352, 354–355, 357–364, 324/366–367, 370–375; 73/152.01–152.02, 73/152.17; 367/21, 25, 37–38, 40–42, 48–49, 367/56–58; 166/248, 250.01

See application file for complete search history.

(56) References Cited

U.S. PATENT DOCUMENTS

| | | | |
|---|---|---|---|
| 4,122,387 | A | 10/1978 | Ajam et al. |
| 4,468,623 | A | 8/1984 | Gianzero et al. |
| 4,642,570 | A | 2/1987 | Sternberg et al. |
| 4,720,681 | A | 1/1988 | Sinclair |
| 5,260,660 | A | 11/1993 | Stolarczyk |
| 5,502,686 | A | 3/1996 | Dory et al. |
| 6,206,108 | B1 | 3/2001 | MacDonald et al. |
| 6,208,585 | B1 | 3/2001 | Stroud |
| 6,600,321 | B2 | 7/2003 | Evans |

(Continued)

OTHER PUBLICATIONS

Earth Imager-OBM Resistivity Imager, [online]; [retrieved on Jun. 19, 2006]; retrieved from the Internet. http://www.bakerhughes.com/bakeratlas/geology/earth_index.htm.

Mitch D. Pavlovic, "A New Approach for Interpreting Lithofacies and Sequence Stratigraphy using Borehole Image Data in Wells Drilled with Non-Conductive Mud Systems". AAPG Annual Convention, Salt Lake City, Utah. May 11-14, 2003. 7 pages.

(Continued)

*Primary Examiner* — Toan M Le
(74) *Attorney, Agent, or Firm* — Cantor Colburn LLP

(57) ABSTRACT

A method for correcting a measurement of a property of a subsurface material includes: selecting an instrument that includes a test circuit and a separate sensor, the test circuit configured for providing a standard for referencing to generate correction information, the sensor configured for: transmitting an electric signal into the subsurface material; and receiving a data signal from the subsurface material; wherein the test circuit and the sensor are switchably coupled to an electronics unit of the instrument; receiving the electric signal from the test circuit in the electronics unit; using the electronics unit, measuring at least one output characteristic of the instrument; and applying the correction information to the data signal according to the measured output characteristic.

25 Claims, 5 Drawing Sheets

U.S. PATENT DOCUMENTS

| | | |
|---|---|---|
| 6,711,502 B2 | 3/2004 | Mollison et al. |
| 6,714,014 B2 | 3/2004 | Evans et al. |
| 7,256,582 B2 | 8/2007 | Gorek et al. |
| 7,797,111 B2 * | 9/2010 | Forgang et al. ................. 702/11 |
| 2005/0030037 A1 | 2/2005 | Fanini et al. |
| 2005/0088180 A1 | 4/2005 | Flanagan |
| 2006/0103388 A1 | 5/2006 | Forgang et al. |
| 2006/0103389 A1 | 5/2006 | Bespalov et al. |
| 2006/0106541 A1 | 5/2006 | Hassan et al. |
| 2007/0103159 A1 | 5/2007 | Forgang et al. |
| 2009/0143989 A1 | 6/2009 | Forgang et al. |

OTHER PUBLICATIONS

Shima et al., Developments of Non-Contact Data Acquisition Techniques in Electrical and Electromagnetic Explorations; 1996, Journal of Applied Geophysics 35, pp. 167-173.

Notification of Transmittal of the International Search Report and the Written Opinion of the International Searching Authority, or the Declaration; PCT/US2011/041665; Feb. 9, 2012.

* cited by examiner

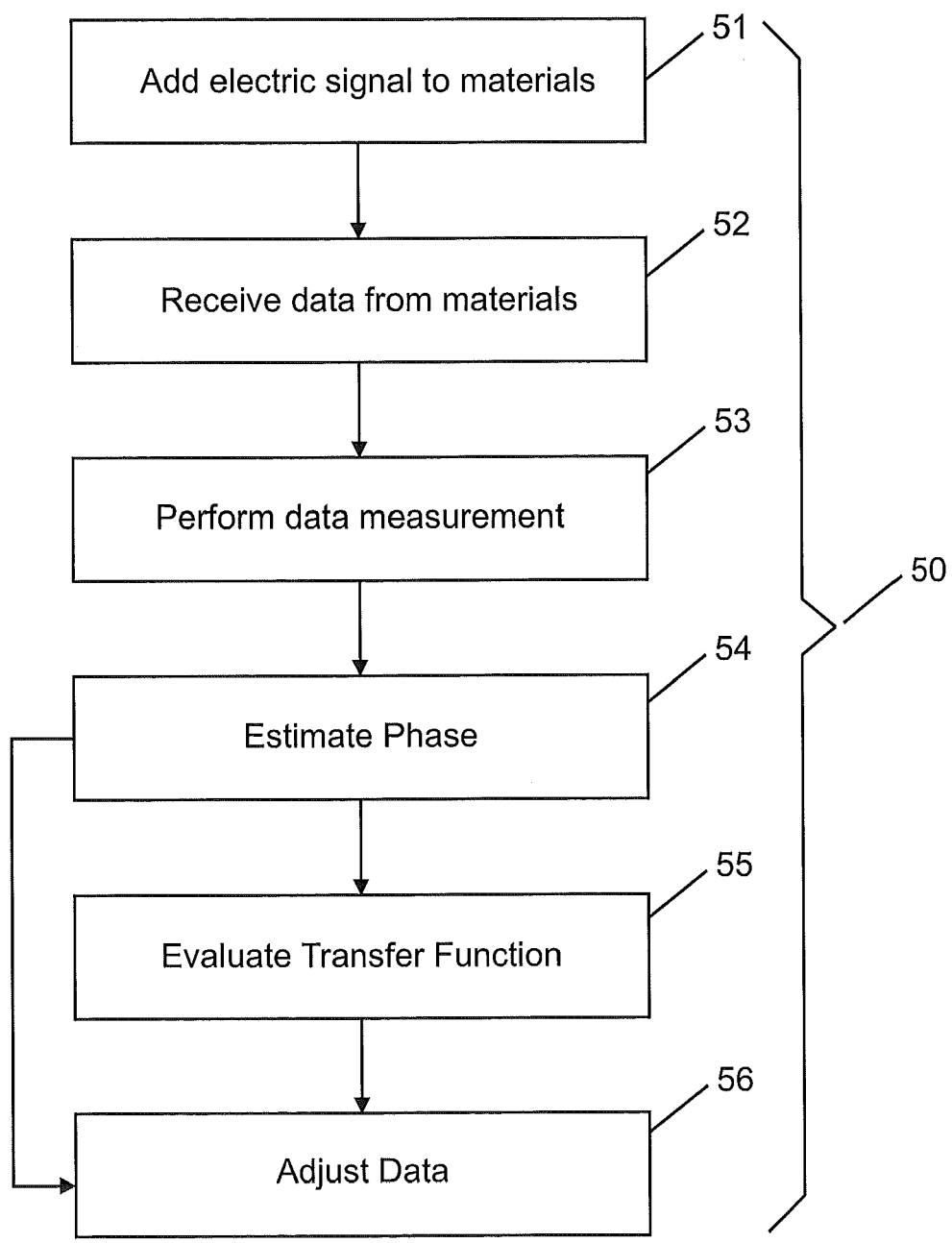

WELLBORE LOGGING PERFORMANCE VERIFICATION METHOD AND APPARATUS

CROSS REFERENCE TO RELATED APPLICATION

This application is a continuation in part of application U.S. Ser. No. 11/947,250 filed Nov. 29, 2007, now U.S. Pat. No. 7,797,111, the contents of which are incorporated by reference herein in their entirety.

BACKGROUND OF THE INVENTION

1. Field of the Invention

The present disclosure relates generally to wellbore imaging, and particularly to a performance verification of an instrument useful for resistivity imaging.

2. Background of the Related Art

Imaging of subsurface materials is of vital importance in the exploration for petro-chemical materials. A number of technologies may be used with a great variety of techniques for employing each of these technologies. Generally, each technique provides a particular advantage for a given situation. One prominent technology is imaging of resistivity of the subsurface materials.

First, and for perspective, consider that imaging of subsurface materials is typically conducted by deploying an imaging instrument in a borehole (also referred to as a "wellbore") which has been drilled into the earth. Often, the process of drilling calls for introducing drilling mud into the borehole. The drilling mud provides a number of benefits, including a restraint against uncontrolled relief of pressure (and hydrocarbons) from downhole. However, use of some formulations of drilling mud, such as those that are oil based mud (OBM) can pose certain problems when attempting to image the subsurface materials.

As known to those skilled in the art of resistivity imaging, there are two major classes of instruments. First, "induction" instruments generally provide primary excitation by a magnetic field generated by an induction transmitter. The second class, "galvanic" instruments use a set of electrodes or electrical dipoles to generate an electrical field due to a potential between them and thus drive currents into the materials surrounding the instrument.

A vast majority of induction instruments operate in a relatively low frequency range. This results in instrument sensors having minimal electromagnetic coupling with the surroundings which results in a small power efficiency of measurement. Advantageously, however, this allows for keeping sensor parameters such as magnetic moments, transfer functions, and characteristic impedances almost unchanged during logging. Using these features of induction instruments, methods have been established for proper instrument verification and calibration, both in the laboratory and at a wellsite.

In contrast, proper instrument verification and calibration for galvanic tools is generally unavailable. This is even more problematic as a new class of high frequency galvanic instruments is proving to be useful for evaluation of sub-surface materials. That is, use of oil based mud (OBM) that is commonly used in drilling, interferes with resistivity measurements. Accordingly, the resistivity effects of the OBM must be accounted for or overcome to properly ascertain properties of the surrounding sub-surface materials.

Attempts to discount effects of OBM on resistivity data have generally relied upon calibration of resistivity instruments on the surface, such as in a laboratory. However, as downhole environments are complex and harsh (for example, such environments often exhibit high temperature and high pressure), calibration completed on the surface is of limited use. More specifically, it has been found that many factors play a role in the performance of the instrument downhole. Accordingly, determinations of instrument performance conducted on the surface are of limited value.

Accordingly, there is a need for in-situ performance verification and/or calibration of a high frequency imaging instrument.

BRIEF DESCRIPTION OF THE INVENTION

Disclosed is a method for correcting a measurement of a property of a subsurface material includes: selecting an instrument that includes a test circuit and a separate sensor, the test circuit configured for providing a standard for referencing to generate correction information, the sensor configured for: transmitting an electric signal into the subsurface material; and receiving a data signal from the subsurface material; wherein the test circuit and the sensor are switchably coupled to an electronics unit of the instrument; receiving the electric signal from the test circuit in the electronics unit; using the electronics unit, measuring at least one output characteristic of the instrument; and applying the correction information to the data signal according to the measured output characteristic.

Further, disclosed is an instrument for imaging subsurface materials, the instrument including: a sensor including at least one transmitter and at least one receiver, configured for transmitting an electric signal through the subsurface materials and collecting material data; at least one test circuit configured for providing a standard for referencing to generate correction information for at least one of adjusting the material data and adjusting controls or settings used to produce the material data; and a device for switching disposed between the sensor and the at least one test circuit, the device including a coupling to an electronics unit for providing one of the material data and the standard for analysis.

In addition, a method for estimating an electrical property of a subsurface material using an instrument is disclosed and includes: applying an electric signal to the subsurface material using at least one transmitter and at least one receiver; receiving a data signal from the subsurface material that includes a current; measuring the current in the data signal; estimating a phase difference between the electric signal and the current of the data signal; periodically evaluating a transfer function of the instrument using a test circuit; and estimating the electrical property of the subsurface material by adjusting the data signal according to the transfer function.

BRIEF DESCRIPTION OF THE DRAWINGS

Referring to the exemplary drawings wherein like elements are numbered alike in the accompanying Figures:

FIG. 5 is a flow chart providing an exemplary method for operation of an instrument implementing the electronics of FIG. 4.

DETAILED DESCRIPTION OF THE INVENTION

Disclosed herein are methods and apparatus for in-situ evaluation of performance of a resistivity instrument useful for evaluation of sub-surface materials. In various embodiments, the instrument is operated as a high-frequency galvanic resistivity imaging instrument. The instrument includes electronic standards for periodic referencing and generation of correction information. The correction information is useful for at least one of adjusting data and adjusting controls or settings used to produce the data. Prior to discussing the invention in detail, some definitions are provided for convenience and convention.

As used herein, the term "test circuit" generally refers to any entity that is useful for generation of a reference electrical signal or standard. More specifically, a test circuit may include a resistor, a capacitor, an inductor, an amplifier, a load, a stimulus, a sample and any combination thereof, and may include a short circuit. The term "subsurface material" makes reference to any material that may be assessed using a downhole instrument. The term "sensor" makes reference to a component that includes at least one set of electrodes. The term "transmitter electrode" makes reference to one or more electrodes of the sensor, just as the term "return electrode" makes reference to one or more opposing electrodes of the sensor. In some embodiments, at least one additional electrode, referred to herein as a "sense electrode" is included in the instrument. In these embodiments, the sense electrode is included in the sensor for performing additional measurements, such as a voltage drop on a wall of a borehole. Generally, one of the transmitter electrodes and the return electrodes are used for generating and measuring electrical signals (and therefore coupled to appropriate electronics for performing measurements).

Figure 1:
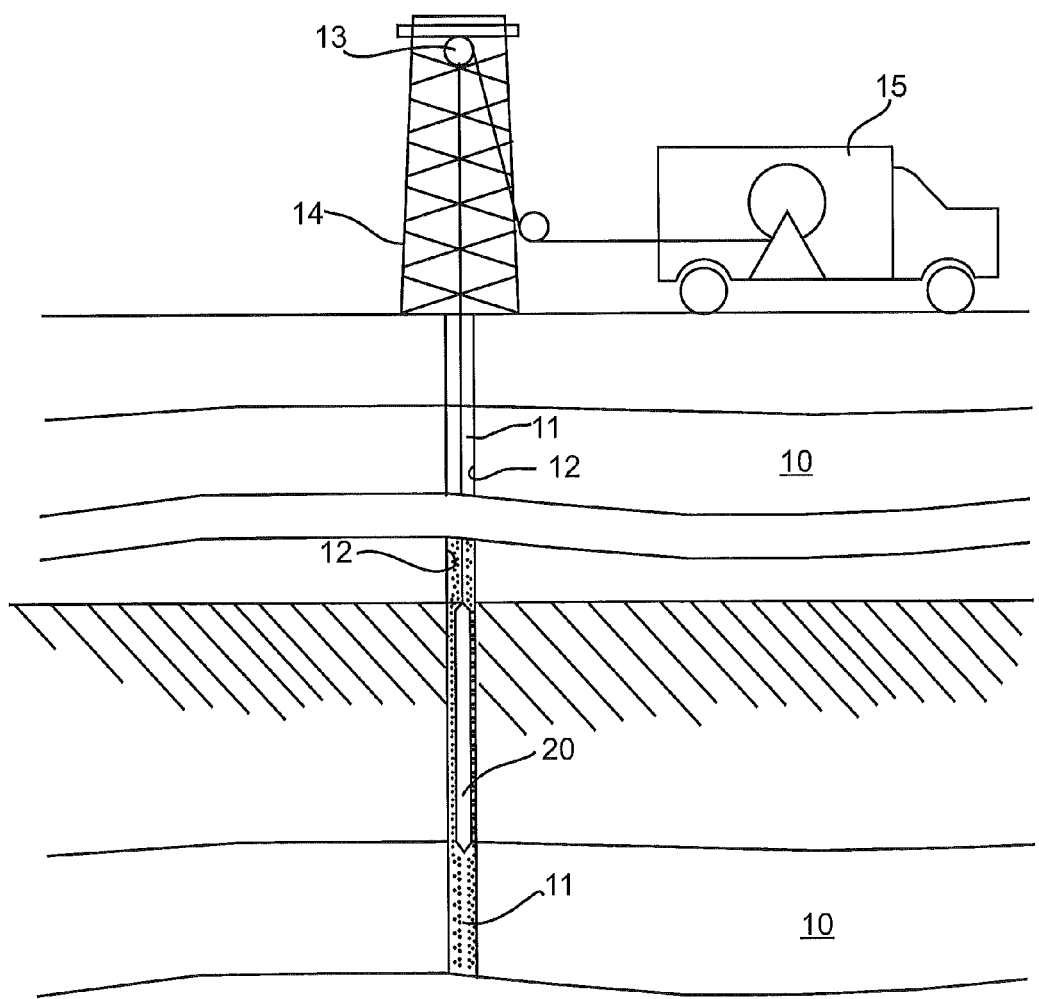
FIG. 1 depicts an exemplary deployment of a instrument used for resistivity imaging.

Aspects of logging a well using the instrument disclosed herein are depicted in FIG. 1. In FIG. 1, a cross-section of earth formations 10 along the length of a penetration referred to as a "wellbore" 11 is depicted. Usually, the wellbore 11 is at least partially filled with a mixture of liquids including water, drilling fluid, mud, oil and formation fluids that are indigenous to the formations 10 penetrated by the wellbore 11. Drilling mud may also be introduced into the wellbore 11 as is known in the art. The drilling mud may be water based mud, or of particular interest and as discussed herein, oil based mud (OBM).

Suspended within the wellbore 11 at the bottom end of a wireline 12 is the imaging instrument 20. The wireline 12 is often carried over a pulley 13 supported by a derrick 14. Wireline 12 deployment and retrieval is typically performed by a powered winch carried by a service truck 15.

At least one of the imaging instrument 20 and the service truck 15 include an electronics unit and support equipment as is needed for operating the imaging instrument 20. Included with the electronics unit and support equipment is a power supply for providing power to the imaging instrument 20, processing capabilities, data storage, memory and other such components. The power provided to the imaging instrument 20 may be delivered over a broad range of frequencies f, and currents I. Signal analysis may include techniques for analog signal processing and digital signal processing as appropriate. Such aspects are generally not discussed in greater detail herein.

Figure 2:
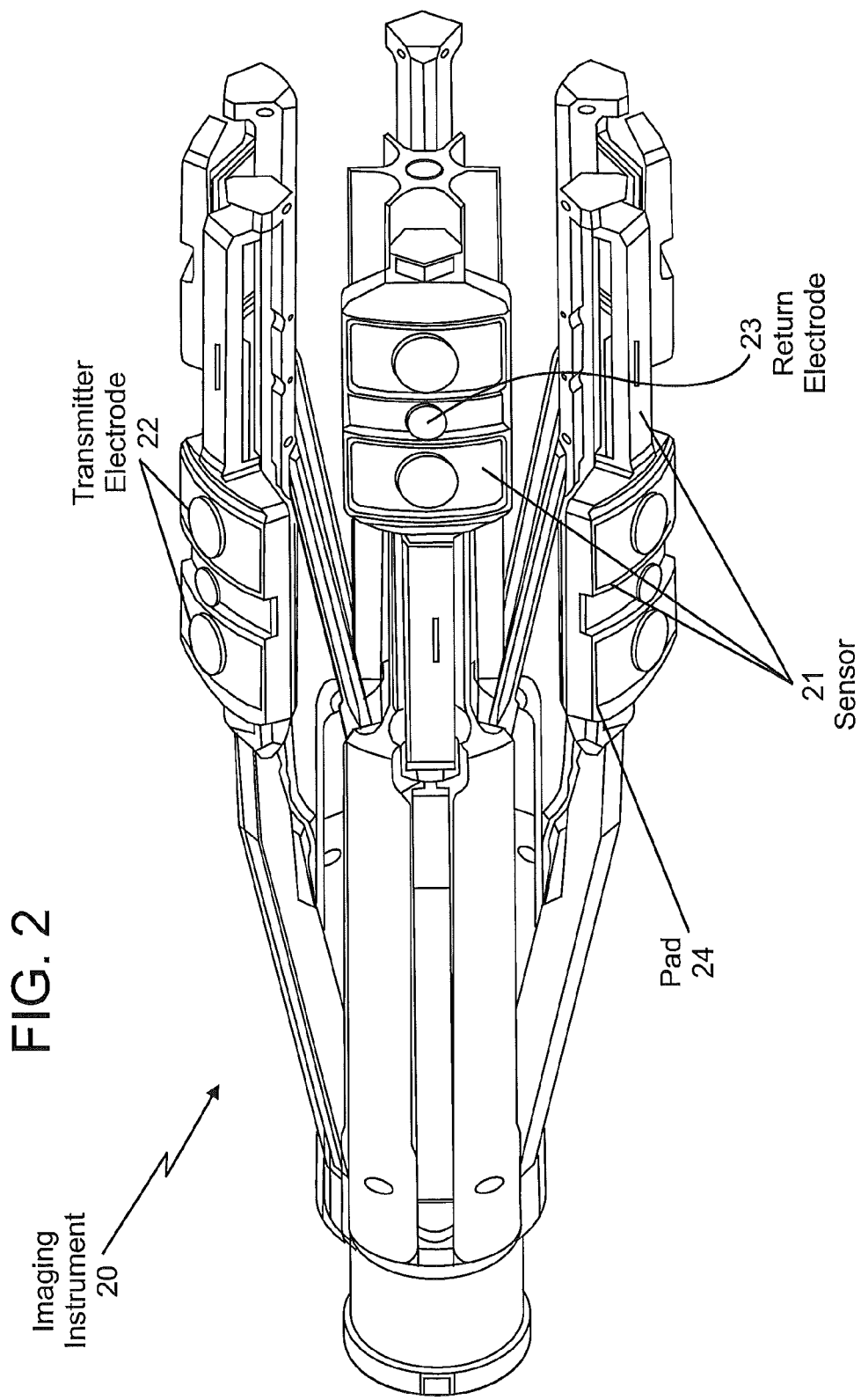
FIG. 2 depicts a plurality of sensors incorporated into the instrument.

Referring now to FIG. 2, a plurality of sensors 21 are shown incorporated into an exemplary embodiment of the instrument 20. Each of the sensors 21 includes at least one transmitter electrode 22 and at least one return electrode 23. In the embodiment depicted, each sensor 21 includes two (2) transmitter electrodes 22 and one (1) return electrode 23. The embodiment shown is adapted for wireline logging, or more specifically, logging after drilling. Accordingly, the sensors 21 are deployed on articulating pads 24 which may be deployed against the wall of the wellbore 11. In other embodiments, the sensors 21 have a much different physical appearance as may be necessary to provide for logging while drilling (LWD). For example, in one embodiment of the sensor 21 used in LWD, one or more transmitter electrodes 22 are used in conjunction with a plurality of return electrodes 23 (not shown). In LWD, the electrodes may be disposed about the surface of a drill string. Of course, a variety of embodiments may be contemplated by those skilled in the art without deviating from the invention disclosed herein.

In one embodiment, the sensor 21 is configured to emit (or receive) current I of frequency f ranging from about 1 MHz to about 10 MHz or higher. In another embodiment, the sensor 21 is configured to emit (or receive) current I of frequency f ranging from about 20 KHz to about 100 MHz. However, the sensor 21 may be operated at frequencies f above or below this range. To obtain the desired geophysical information, the phase-discriminative current measurements are typically conducted within this frequency range, with an overall phase inaccuracy not exceeding a few tenths of a degree.

Figure 3:
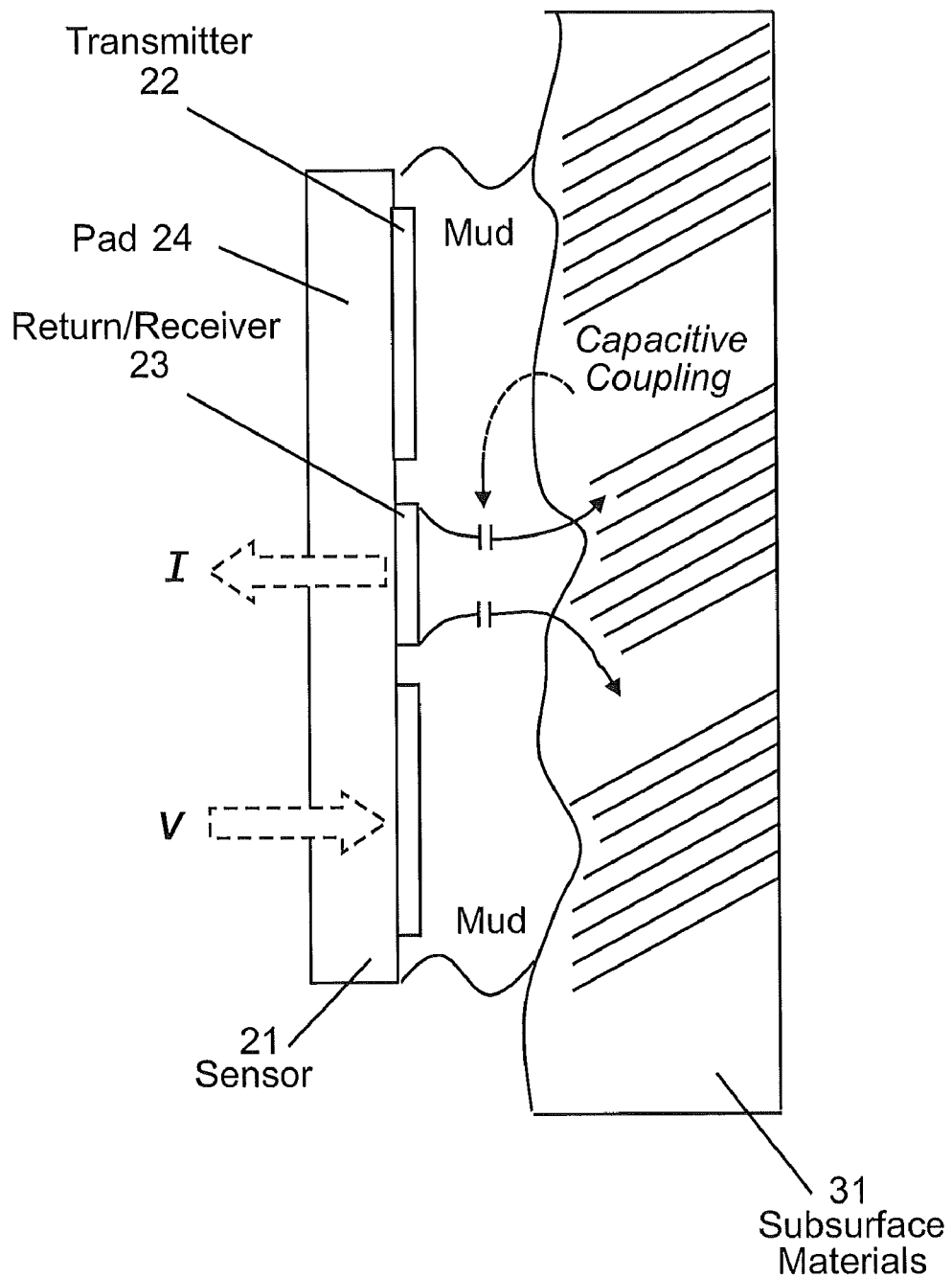
FIG. 3 depicts aspects of capacitive coupling when using oil based mud.

Referring now to FIG. 3, aspects of the sensor 21 are shown in conjunction with subsurface materials 31, such as may be included within the formations 10. As shown in this illustration, the OBM, or "mud" has a capacitive effect on current, I. Effects from this layer of mud (referred to as the "standoff layer") on measurement data must be identified, discounted or otherwise overcome in order to ascertain accurate information regarding properties of the subsurface materials 31.

Figure 4:
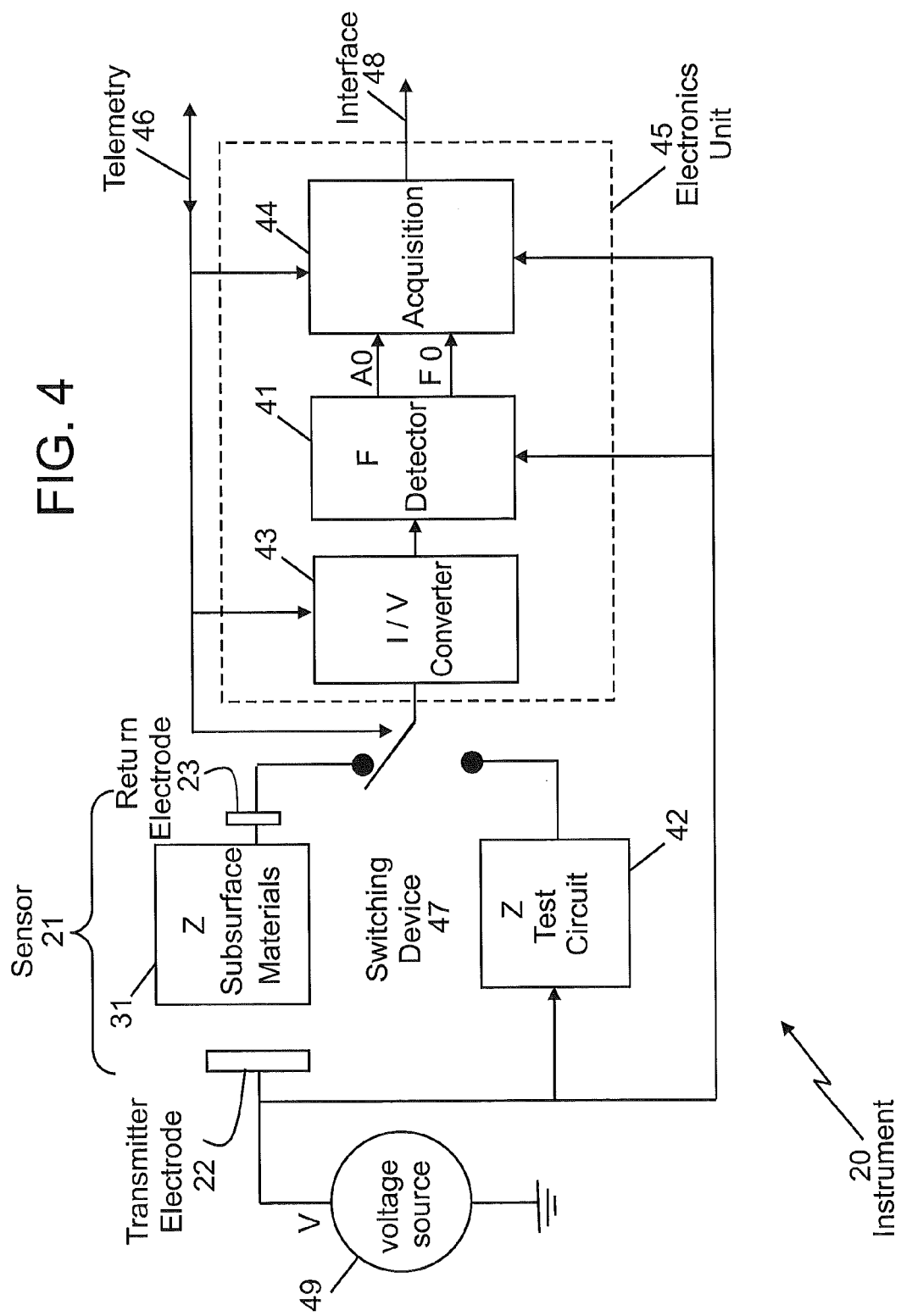
FIG. 4 is a schematic diagram providing an overview of electronics for performing measurements.

Turning now to FIG. 4, an overview and exemplary embodiment of aspects of the instrument 20 according to the teachings herein is depicted. In this example, a switching device 47, such as a switch, switchably couples one of the sensor 21 and at least one test circuit 42 to an electronics unit 45. In this example, the switching device 47 couples the return electrode 23 of the sensor 21 to the electronics unit 45. In the electronics unit 45, a current-to-voltage converter 43 may be provided. The current-to-voltage converter 43 receives current I from the coupled sensor 21 or the coupled test circuit 42 and converts the current I to the voltage V suitable for operations of the circuits following this module. This signal is provided to a phase detector 41 that also receives input from the voltage source 49 and produces phase shift information, $\Phi_0$, and amplitude, $A_0$ or the current I. An acquisition module 44 provides "back end" electronics as may be necessary for controlling the instrument and capturing, processing, and communicating data. It should be noted, however, that telemetry 46 and components for implementation of telemetry 46 may also be used. In the embodiment depicted, the acquisition module 44 includes an interface 48 to provide data and receive commands from topside systems. Other components, such as a controller useful for governing the switching device 47 may be included, however, such components are not shown.

In some embodiments, the switching device 47 is implemented as hardware. However, the switching device 47 may be implemented by software or by other techniques as are known in the art.

By repositioning the switching device 47, the instrument 20 is provided with a capability to one of perform logging by use of the sensor 21 (LOG mode) and evaluate performance of the instrument 20 by use of the test circuit 42 (CAL mode). That is, in LOG mode, the instrument 20 is used for collecting a data signal useful for characterizing the subsurface materials 31, while in CAL mode, the instrument 20 collects performance data useful for characterizing performance of the instrument 20. Of course, the performance data may be applied advantageously for at least one of adjusting the data signal and adjusting controls or response of the instrument 20.

With regard to the test circuit 42, a variety of embodiments may be had. For example, the test circuit 42 may include any one or more of a resistor, a capacitor, an inductor, an amplifier, a load, a stimulus, a sample and any combination thereof, and may include a short circuit. The test circuit 42 generally provides a standard for referencing during operations downhole. Some components suited for use in the test circuit 42 include high quality resistors (such as high quality ceramic materials), and other similar materials. In some embodiments, the test circuit 42 is fabricated onto a single substrate that provides for uniform environmental conditions (e.g., temperature of components) and maybe further embedded onto a single substrate together with the switch 47 and current-to-voltage converter 43. As a further example, the test circuit 42 may include commercially available components that provide relevant and reliable signal information in complex or harsh environments.

Accordingly, it should be understood that some aspects or properties (such as capacitance) of the test circuit 42 may vary (such as with environmental conditions), while other properties may not vary appreciably (such as resistance). In some embodiments, the properties of the test circuit 42 vary (such as with temperature), however, prior characterization of the properties provides for useful standards information.

As may be surmised, use of the test circuit 42 (CAL mode) may be initiated by any one or more of an automatically issued command, a user issued command, passage of a predetermined time interval, a change in environmental conditions, a change in the data signal and by other such techniques. The instrument 20 may be returned to LOG mode as determined appropriate. For example, after completion of a test procedure (such as evaluation of response for a plurality of test circuits 42), after statistical reliability is ascertained, after a given number of evaluations or by other similar determinations.

In general, the test circuit 42 is designed to mimic or accommodate measurement situations that might be encountered downhole. For example, the test circuit 42 may be selected to mimic conditions with minimal amplitudes of the current I and its minimal detected phase shifts occurring with changes in the logging environment (for example, changes to mud conductivity and permittivity, formation resistivity, aspects of the standoff layer). This allows for better resolution of any intrinsic equipment problems such an internal phase delays in electronics, imperfections of phase detection schemes, and noise, for example. This mimic procedure may be relaxed if high schematic linearity over the dynamic range of the input signal has been established.

On the other hand, if the input circuit behavior is complex, its transfer function is verified over a large dynamic signal range and, in certain conditions, with operation at different measurements frequencies. The following parameters may be verified: the magnitude of the transfer function, that is, magnitude of the respective device output signal as a function of network impedance magnitude (signal proportional to the magnitude of the measured formation impedance) or magnitude of transmitter signal V; a slope of the device phase transfer function; and, the phase offset in the device transfer function.

In an exemplary embodiment of the instrument 20, a potential, V, is applied to the subsurface materials 31. More specifically, an electric signal is produced by a high frequency voltage source 49 is directed into the subsurface materials 31 (using the at least one transmitter electrode 22) and received by the return electrode 23. The flow of current İ sees a complex impedance Ż, which in a first approximation could be envisioned as a series connection of active (formation) resistance R and mud reactance X, that is, $\dot{Z} \approx R + iX$. The active part R of the impedance is useful information that can be related to the resistivity of the subsurface material 31. However, in a majority of applications, X>>R. Thus, in order to resolve for the resistance R, it is desirable to determine both magnitude and phase of the current İ with sufficiently high accuracy. In some embodiments, emphasis is given to ensuring the performance of the current-to-voltage converter 43 together with the phase detector 41. Generally, the measurement can tolerate a reasonably high error in magnitude transfer function, as it may be corrected while data post-processing.

Complex measurements usually derive the magnitude of the impedance Z and phase φ of the total impedance Z in front of the return electrode 23, as Z=V/mod(İ), where mod(İ) represents a magnitude of the complex current İ. In this notation, the resistive part could be determined as R=Z cos(φ), where φ gets closer to π/2 with decreasing formation resistivity or increasing standoff (i.e., increasing effective mud-to-formation impedance ratio). For this condition, the ratio of X to R could easily reach 50 to 100 and, therefore, even a small measurement phase inaccuracy may result in significant measurement error quickly propagating to a percentage in the hundreds.

When the current İ is measured at the return electrode 23, the instrument 20 may introduce distortions due to its imperfections, such as presence of parasitic couplings, and phase delays in electronics, for example. The overall expression for distortions may be quite complicated, however, for practicality, accounting for distortions may be simplified to:

$$R = Z \cdot (k_0 + k) \cdot \cos(\phi + \alpha) \quad (1)$$

where $k_0$ represents a system gain, k=Δk+dk represents a gain error, including systematic (permanent) components Δk and random components dk, and α=α0+dα represents a phase shift error, including systematic (permanent) components α0 and random components dα. Notice that the term "random" as used in this context generally refers to unpredictable variability resulting from environmental parameters (such as temperature, for example) rather than actual noise-related and time-dependant behavior. That is, "random" as used in this context appears more as systematic variability which is caused by unpredictable changes.

It may be shown that in the case where the systematic errors are dominating over the variables, that is, Δk>>dk and α0>>dα, the measured resistances would experience a "parallel" shift in their values, that is, the processed curves would look as though they have an incorrect, but consistent gain. This error may be corrected by either pre-logging calibration of the instrument 20 using physical models, taken into account through image processing by dynamic scaling, or by other such techniques.

A calculation error can appear when random error components do not remain negligible and change due to temperature, fluctuation in the voltage source 49 or by other similar factors. In this case, error may be alternatively obtained as $dR \sim Z \cdot [dk \cdot \cos(\phi + \alpha) - (k_0 + k) \cdot \sin(\phi + \alpha) \cdot d\alpha]$, and for a majority of application measurement angles where φ+α→π/2, such an error can lead to $dR \sim Z \cdot (k_0 + \Delta k) \cdot d\alpha$.

Development experience has shown that fluctuations of the phase shift dα are not always linear with temperature changes. Moreover, such fluctuations may exhibit hysteresis, such as for instance, delivering different values at a certain defined temperature while the actual temperature is rising versus falling through the defined temperature. Such non-linearity in tool behavior is typically non-recoverable by post-processing and theoretically could be taken into account only by exhaustive multivariable calibration of the entire instrument.

Referring now to FIG. 5, a first and simplified exemplary embodiment for operating the instrument 20 is provided. The method for operating 50 calls for applying an electric signal to the subsurface materials 51 (i.e., establishing a potential between the at least one transmitter electrode 22 and the at least one return electrode 23). Once the potential is established, the instrument 20 begins receiving data from the subsurface materials 52. The electronics unit 45 engages in performing measurement of the data 53 and estimating phase 54 of current I received from the materials. The method for operating 50 also calls for periodically evaluating (and perhaps updating) the transfer function of the instrument 55 by switching in the test circuit 42. Having updated the transfer function, the method for operating 50 then performs adjusting of the data 56. Of course, as evaluation of the transfer function may be periodic or intermittent, this step may be skipped (as shown by the arrow in FIG. 5). Aspects of operation are now reviewed in greater detail.

Another exemplary and more detailed embodiment for performance verification (CAL mode) is now provided. First, the instrument 20 is placed into CAL mode by disconnecting the electronics unit 45 from the sensor 21, and connecting the test circuit 42. In this example, the test circuit 42 defines an arbitrary well formation impedance (Z-calibration). Known operating reference parameters are made available to the electronics unit 45.

Such reference parameters generally include two sets of values. A first set of values incorporates magnitude of the transmitter signal V (associated with aforementioned magnitude of the transfer function), transmitter signal frequency, $f_0$ (associated with aforementioned slope of the device phase transfer function), and, if required, the phase reference $\psi_0$ of the transmitter (associated with aforementioned phase offset in the device transfer function). A second set of values includes calibration values such as expected and predefined electronics gain and phase shift, both of which are to be verified in the CAL mode. Characteristics of the transfer function may be noted as being in a frequency domain or a time domain. In the time domain, one characteristic may be characterized by a signal time delay.

Typically, the instrument 20 used for wireline logging or LWD imaging exhibits linear response and possesses the following qualities: system modules do not perform non-linear operations and, therefore, no internal frequency transformation (change value, appearance of harmonics, cross-modulations) has happen; magnitude of the input signal (such as current I) has been proportional to the excitation value, (i.e., magnitude of transmitter voltage V); a single master clock has been used for operating both transmitter and processor and, therefore, the information regarding frequency $f_0$ may not need to be passed.

For purposes used herein, a zero-subscript on a signal parameter denotes a reference value for that parameter, while a non-subscript denotes a general value. In an embodiment, the initial transmitter phase $\psi$ is defined by inherent characteristics of the electronic circuitry of the transmitter. Since it is likely that the initial transmitter phase $\psi$ is temperature dependent, an embodiment of the invention may include determining the actual shift of in initial transmitter phase with respect to the master clock signal. However, for practical purposes, the initial transmitter phase may be assumed as $\psi_0=0$ as only a relative value. That is, the phase angle $\phi$ between transmitter voltage V and current I is needed. Next, a signal parameter value, such as its amplitude A and phase $\phi$, for example, at the output of the measured electronics is determined.

The measured value of the input signal (amplitude A, or phase, $\phi$, for example) is then compared with the respective reference value. In an embodiment, at least two measured values are compared with the respective amplitude reference, $A_0$, and phase reference, $\phi_0$. In response to the measured value and respective reference value being outside of a defined tolerance, at least one of the signal parameters of the input signal is adjusted, the transmitter signal retransmitted, the same input signal parameter value remeasured, and the remeasured value compared with the respective reference value.

Adjustment of the input signal may be to at least one of the amplitude A and the phase $\phi$, which may be for the purpose of adjusting the transmitted amplitude or frequency, or may be for the purpose of adjusting the transmitted phase $\psi$. Alternatively, the adjustment may be to an amplifier gain at the receiver. The adjustment to a signal parameter may be linear or non-linear, may be a function of one or more of the other parameters, may be a function of temperature, may result in a positive or negative change to the signal gain or offset, or may be used to introduce a phase delay into the transmitted signal.

Phase delay may be adjusted by implementations of at least one of software and hardware. For example, if adequate processing is available, once phase offset $\Delta\phi$ is determined, the processing may be used (such as in the acquisition module 44) to propagate the delay. Using hardware, a delay line (not shown) may be incorporated (such as between the voltage source 49 and the phase detector 41). In this embodiment, the delay line may be used to introduce and propagate a delay of the signal from the voltage source 49, such that the phase difference is compensated.

In response to the measured or remeasured value and respective reference value being within a defined tolerance, a sensor linearity verification may be performed to determine whether a change in slope of the input signal $\Delta_{IN}$ results in correlating change in slope of the transmitted signal $\Delta_{OUT}$. In response to the sensor linearity verification, the instrument may proceed with signal transmission and data acquisition, stop signal transmission, or adjust a signal parameter in preparation for another retransmission, remeasure and re-compare operation.

In some embodiments, and in response to a timeout period elapsing, the instrument 20 may transfer out of the measure, compare and adjust loop, and a determination may be made as to whether to proceed with signal transmission, stop signal transmission, or adjust an operational characteristic associated with signal transmission. In an embodiment, the timeout period is provided by a timer. Since the bottom hole assembly (BHA) of the logging tool is typically in constant motion, data acquisition may shut down in response to the timeout period elapsing, or data acquisition may simply be adjusted. In general, the timeout period is a function of the application, which typically includes the logging speed or the sampling rate, and which is typically based on tool depth and operational time. In an embodiment, adjustment of an operational characteristic means adjustment of a sampling rate of the data acquisition.

The method may optionally include a transmitter verification operation. Here, the transmitted signal may be calibrated, for example, by testing amplitude V, frequency f, and phase $\psi$ of the transmitted signal relative to the respective reference, and by verifying whether a change in slope of the input signal $\Delta_{IN}$ results in a correlating change in slope of the transmitted signal $\Delta_{OUT}$. If not, a signal parameter of the transmitter signal is adjusted accordingly. In an embodiment, the transmitter verification occurs prior to the calibration operation. However, it will be appreciated that the scope of the invention is not intended to be limited to this sequence of events, and contemplates the calibrating operation occurring subsequent to the verifying operation.

In an embodiment, the calibration may be performed at different frequencies, and may be performed concurrently with the data acquisition. Alternatively, switching back and forth between calibration and data acquisition may be performed. In an embodiment, and while in calibration mode, the absolute and delta values of the signal parameters may be changed ex-situ, while only the delta values are changed in-situ.

While some embodiments of the invention have been described with reference to OBM imaging, which typically involves non-conductive mud, it will be appreciated that embodiments may also be applicable to conductive boreholes, where it may not be necessary to measure the phase angle φ, and only the amplitude A may need to be measured.

Further, it should be recognized that while the disclosure herein describes the invention in relation to sensors 21 disposed upon the pad 24, this embodiment is merely illustrative and not limiting. For example, aside from LWD applications, the sensor 21 may be distributed over multiple pads 24, a portion being pad mounted while another portion is included in the body of the instrument 20, and in any variety of physical arrangements deemed appropriate.

In view of the foregoing, some embodiments of the invention may include one or more of the following advantages: utilization of the disclosed method in different embodiments depending on the complexity of a selected current-to-voltage converter and phase detector in the pad, stability of components, and mechanical layout; a sensor apparatus having a calibrated and stable phase-shifting network built into the pad; the ability to design the phase-shifting network with a complex impedance close to the one most critical for pad measurement, that is, minimal specified R with maximum specified X; enabling the pad electronics to measure network impedance in real time while logging via a surface command, or according to the pad firmware controlling changes in operating environment; providing for measurement of formation impedance in LOG mode independent of the formation impedance seen at the button; calculating actual gain and phase shift based on the verification measurement and applying respective corrections to the logging data in real time; and, providing for the verification data to be recorded or sent to surface data collectors by means of telemetry for further processing.

It can be appreciated that the techniques disclosed above for correcting a measurement of a property of the subsurface materials 31, while discussed with respect to galvanic logging instruments, are also applicable to induction logging instruments. The imaging instrument 20 configured for induction logging transmits an electromagnetic signal (also referred to as an electric signal) having an alternating magnitude into the subsurface materials 31 using an antenna or coil. In the subsurface materials 31, the transmitted electromagnetic signal induces circulating currents or eddy currents. These circulating currents in turn emit a return electromagnetic signal, which is received by an antenna or coil at the induction imaging instrument 20. Characteristics of the return electromagnetic signal are related to the resistivity or conductivity of the subsurface materials 31 through which the circulating currents flow. Hence, by receiving and measuring the return electromagnetic signal, the resistivity or conductivity of the subsurface materials 31 can be determined.

Referring back to FIG. 3, the transmitter 22 is generally an electrode in a galvanic logging instrument. However, the transmitter 22 in an induction logging instrument can also represent an antenna, a coil, or similar transmitting device configured to transmit the transmitted electromagnetic signal. Similarly, the return 23 in the induction logging instrument can also represent an antenna, a coil, or similar receiving device configured to receive the return electromagnetic signal. Hence, the return 23 may also be referred to as the receiver 23.

Herein, the transmitter 22 may refer to an electrode in a galvanic logging instrument or an electromagnetic signal transmitting device in an induction logging instrument. Similarly, the receiver 23 may refer to an electrode in a galvanic logging instrument or an electromagnetic signal transmitting device in an induction logging instrument.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to conduct in-situ circuit performance verification for wellbore logging data acquisition apparatus that receives resistivity imaging data in real time.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. The conjunction "or" when used with a list of at least two terms is intended to mean any term or combination of terms.

What is claimed is:

1. A method for correcting a measurement of a property of a subsurface material, the method comprising:
   selecting an instrument that comprises a test circuit and a separate sensor, the test circuit configured for generating an electric test signal comprising an amplitude and a phase that mimic a downhole measurement environment to generate correction information, the sensor configured for: transmitting an electric signal into the subsurface material; and receiving a data signal from the subsurface material; wherein the test circuit and the sensor are switchably coupled to an electronics unit of the instrument;
   receiving the electric test signal from the test circuit in the electronics unit;
   using the electronics unit, measuring at least one output characteristic of the instrument; and
   applying the correction information to the data signal according to the measured output characteristic.

2. The method as in claim 1, wherein the output characteristic comprises a transfer function.

3. The method as in claim 2, wherein the transfer function comprises at least one of a frequency response, a gain, a gain offset, phase, a phase offset, and a time delay.

4. The method as in claim 1, further comprising at least one of applying another electric test signal and using another test circuit to perform measuring at least an additional output characteristic.

5. The method as in claim 4, wherein the another electric test signal comprises another frequency.

6. The method as in claim 1, wherein use of the test circuit is initiated by at least one of: an automatically issued command, a user issued command, passage of a predetermined time interval, a change in environmental conditions, a change in internal conditions of the instrument and a change in the data signal.

7. The method as in claim 6, wherein the change in environmental conditions comprises at least one of a change in temperature, pressure and a type of subsurface material.

8. The method as in claim 6, wherein the change in internal conditions comprises at least one of a change in the electric signal, a change in the voltage source, a change in electronic noise and a change in the power supply.

9. The method as in claim 1, further comprising selecting the electric test signal to mimic conditions occurring with changes in the downhole measurement environment.

10. The method as in claim 9, wherein the changing conditions comprise changes to borehole conditions.

11. The method as in claim 10, wherein the changes to borehole conditions comprise changes to mud conductivity and permittivity.

12. The method as in claim 10, wherein the changes to borehole conditions comprise changes to aspects of a standoff layer.

13. The method as in claim 9, wherein the changing conditions comprise a change to formation resistivity.

14. An instrument for imaging subsurface materials, the instrument comprising:
   a sensor comprising at least one transmitter and at least one receiver configured for transmitting an electric signal through the subsurface materials and collecting material data;
   at least one test circuit configured for generating an electric test signal comprising an amplitude and a phase that mimic a downhole measurement environment to generate correction information for at least one of adjusting the material data and adjusting controls or settings used to produce the material data; and
   a device for switching disposed between the sensor and the at least one test circuit, the device comprising a coupling to an electronics unit for providing one of the material data and the electric test signal for analysis.

15. The instrument as in claim 14, wherein the sensor further comprises at least one sense electrode configured to measure a potential difference due to the electric signal.

16. The instrument as in claim 15, wherein the potential difference is measured between the at least one sense electrode and at least one of the transmitter electrode and the return electrode.

17. The instrument as in claim 14, wherein the electronics unit is configured to measure at least one of a current, a voltage and a phase.

18. The instrument as in claim 17, wherein at least one of the voltage, the current and the phase is derived from one of the sensor and the test circuit.

19. The instrument as in claim 14, wherein the test circuit may be characterized by a transfer function.

20. The instrument as in claim 19, wherein the transfer function comprises at least one of a frequency response, a gain, a gain offset, a phase, a phase offset, and a time delay.

21. The instrument as in claim 14, wherein the electronics unit comprises at least one of data storage, a processor, an interface, a switch controller and a component for communication via telemetry.

22. The instrument as in claim 14, wherein the electronics unit further comprises adjustable controls for calibrating the instrument according to the electric test signal.

23. The instrument as in claim 14, wherein the electric signal comprises a frequency in a range of about 20 KHz to about 100 MHz.

24. The instrument as in claim 14, further comprising a computer program product stored on machine readable media, the product comprising machine executable instructions for:
   receiving the electric test signal from the test circuit in the electronics unit;
   using the electronics unit, measuring at least one output characteristic of the instrument; and
   at least one of applying a correction to the material data according to the measured output characteristic and performing a calibration according to the measured output characteristic.

25. A method for estimating an electrical property of a subsurface material using an instrument, the method comprising:
   applying an electric signal to the subsurface material using at least one transmitter and at least one receiver;
   receiving a data signal from the subsurface material that comprises a current;
   measuring the current in the data signal;
   estimating a phase difference between the electric signal and the current of the data signal;
   periodically evaluating a transfer function of the instrument using a test circuit that generates an electric test signal comprising an amplitude and a phase that mimic a downhole measurement environment; and
   estimating the electrical property of the subsurface material by adjusting the data signal according to the transfer function.

* * * * *